US005456078A

United States Patent [19]

Goloff

[11] Patent Number: 5,456,078

[45] Date of Patent: Oct. 10, 1995

[54] METHOD OF PURGING A HYDRAULIC SYSTEM

[75] Inventor: Charles N. Goloff, Secor, Ill.

[73] Assignee: Caterpillar Inc., Peoria, Ill.

[21] Appl. No.: 289,463

[22] Filed: Aug. 12, 1994

[51] Int. Cl.[6] ............................ F16D 31/00; F16D 33/00

[52] U.S. Cl. ................................ 60/327; 60/453; 60/494

[58] Field of Search ............................ 60/327, 325, 453, 60/454, 468, 494

[56] References Cited

U.S. PATENT DOCUMENTS

| | | | |
|---|---|---|---|
| 3,154,087 | 10/1964 | Beaver | 60/453 X |
| 3,157,478 | 11/1964 | Edwards | 60/453 X |
| 3,943,717 | 3/1976 | Schexnayder | 60/453 |
| 4,059,042 | 11/1977 | Bridwell et al. | 91/469 |
| 4,141,216 | 2/1979 | Engel | 60/454 |
| 4,685,293 | 8/1987 | McBeth | 60/453 X |
| 4,990,111 | 2/1991 | Saitoh et al. | 60/453 X |

*Primary Examiner*—F. Daniel Lopez

*Assistant Examiner*—Hoang Nguyen

*Attorney, Agent, or Firm*—J. W. Burrows

[57] ABSTRACT

In all hydraulic systems, it is important to remove all entrained air, dirt and other impurities from the system prior to normal operation. In the subject invention, a method of purging and/or preconditioning a hydraulic system is provided and includes the steps of connecting a shunt line between opposite ends of respective fluid actuators and operating the respective valve mechanisms to force fluid from the source of pressurized fluid through the respective valve mechanisms across the respective shunt lines and back to the reservoir. Likewise, the subject invention provides a method to purge the signal control system of any entrained air, dirt and other impurities. The method also provides an easy process of "warming up" the system or totally replacing all of the fluid in the system with another type of fluid, such as fluid for arctic conditions. The method of purging the signal control system includes selectively connecting a bypass line between the reservoir and the signal control system. The above method provides an efficient and simple way to purge a hydraulic system of entrapped air, dirt and other impurities.

5 Claims, 1 Drawing Sheet

METHOD OF PURGING A HYDRAULIC SYSTEM

TECHNICAL FIELD

This invention relates generally to cleansing of hydraulic systems and, more particularly, to purging a hydraulic system in order to remove contaminants such as air, dirt and other impurities.

BACKGROUND ART

It has always been necessary to insure that hydraulic systems are free of air, dirt and other impurities in order to insure that the system operates in an efficient and effective manner. It is well known to partially disconnect a conduit in order to bleed air from a liquid system. However, this method of bleeding air also allows some of the liquid to drip or flow out thus being detrimental to the environment. Furthermore, this method of venting air does not aid in the purging of dirt and other debris from the system. In order to remove dirt from a system, it is known that a conduit can be totally disconnected and air can be blown through the line. This method can be beneficial in removing larger particles but is not very effective in removing smaller particles. Some smaller particles can be removed by flowing a liquid through the line but the rate of flow of the liquid must be small due to the fact that the disconnected line is not easily contained. In some applications, purging of the system may merely be a need to cause the fluid in the lines to flow therethrough to overcome frictional resistance due to the fluid being cold. In other applications, it may be necessary to completely change the type of fluid in the hydraulic system without having to worry about spilling fluid and contaminating the environment.

The present invention is directed to overcoming one or more of the problems as set forth above.

DISCLOSURE OF THE INVENTION

In one aspect of the invention, a method of purging a hydraulic system is provided. The hydraulic system has a source of pressurized fluid which receives fluid from a reservoir, one or more fluid actuators, one or more valve mechanisms connected to the source of pressurized fluid and operative to direct pressurized fluid to the respective fluid actuators, and a signal control system. The method of purging the hydraulic system includes the steps of connecting a shunt line between opposite ends of the respective fluid actuators, operating the respective valve mechanisms to flow pressurized fluid from the source of pressurized fluid through the respective valve mechanisms across the respective shunt lines and back to the reservoir, thus purging the system.

The present invention provides a method of purging a hydraulic system that allows fluid flow from the main source of pressurized fluid to move throughout the system at a high velocity without causing any of the functions of the vehicle to be actuated. By moving the fluid through the lines of the hydraulic system at a higher velocity, the dirt, air, and other impurities can be more efficiently purged from the system.

BEST MODE FOR CARRYING OUT THE INVENTION

Figure 1:
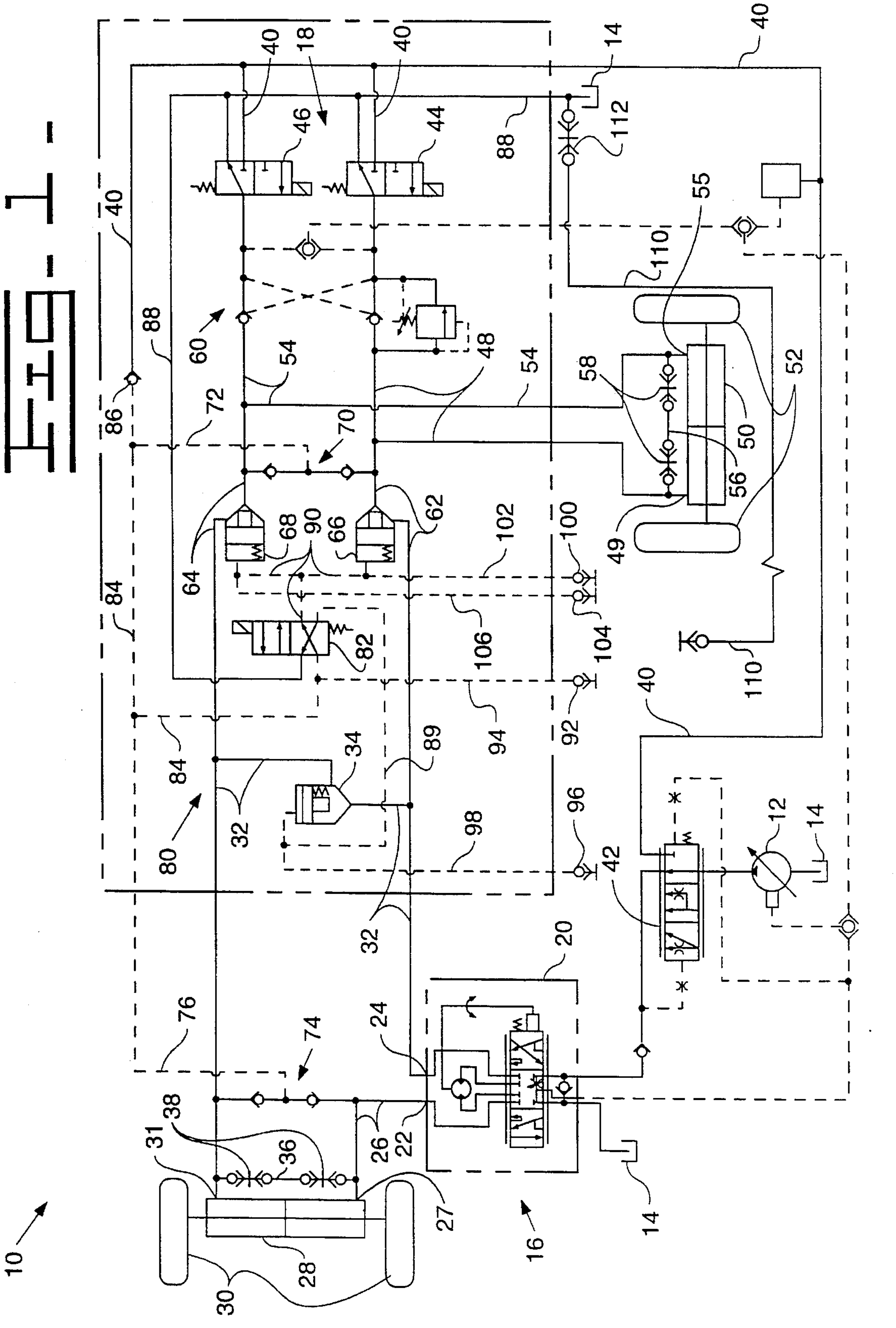
FIG. 1 is a schematic representation of a hydraulic system including an embodiment of the present invention.

Referring to the single drawing, a hydraulic system 10 is shown and adapted for use on a machine (not shown). The hydraulic system 10 includes a source of pressurized fluid 12 that receives fluid from a reservoir 14 and delivers the pressurized fluid to a front steering valve mechanism 16 and a rear steering valve mechanism 18. The front steering valve mechanism 16 is a hand metering unit 20 that has first and second outlet ports 22,24. The first outlet port 22 of the hand metering unit 20 is connected through a conduit 26 to one end 27 of a fluid actuator mechanism 28 that is operative to steer a front pair of wheels 30. The second outlet 24 of the hand metering unit 20 is connected to the other end 31 of the fluid actuator 28 by a conduit 32. A normally open pilot operated poppet valve 34 is disposed in the conduit 32 between the second outlet port 24 and the other end 31 of the fluid actuator 28. A shunt line 36 is coupled between the conduits 26 and 32 generally adjacent the fluid actuator mechanism 28. The shunt line 36 can be quickly removed and/or installed by a pair of quick disconnects 38.

The source of pressurized fluid 12 is connected to the rear steering valve mechanism 18 by a conduit 40. A priority valve 42 is disposed in the system generally adjacent the source of pressurized fluid 12 and is operative to deliver pressurized fluid to the hand metering unit 20 on a priority basis and secondarily delivers pressurized fluid to the rear steering valve mechanism 18 through the conduit 40.

The rear steering valve mechanism 18 includes first and second two-position three-way valves 44,46 each respectively connected to the source of pressurized fluid through the conduit 40. A conduit 48 connects the first two-position three-way valve 44 to one end 49 of a second fluid actuator 50 that is operatively coupled between a rear pair of wheels 52. A conduit 54 connects the second two-position three-way valve 46 to the other end 55 of the second fluid actuator 50.

A second shunt line 56 is connected between the conduits 48,54 generally adjacent the second fluid actuator mechanism 50. The second shunt line 56 can be quickly removed and/or installed by a second pair of quick disconnects 58.

A lock valve 60 is disposed in the conduits 48,54 between the first and second two-position three-way valves and the second fluid actuated mechanism 50 and is operative to prevent fluid flow from the fluid actuated mechanism 50 to the first and second two-position three-way valves 44,46 when they are not actuated.

A conduit 62 connects the conduit 48 at a location between the one end 49 of the rear fluid actuated mechanism 50 and the lock valve 60 to the conduit 32 at a location between the second outlet port 24 and the normally open pilot operated poppet valve 34. A conduit 64 connects the conduit 54 at a location between the other end 55 of the fluid actuated mechanism 50 and the lock valve 60 to the conduit 32 at a location between the other end 31 of the fluid actuator mechanism 28 and the normally open pilot operated poppet valve 34. A normally closed pilot operated poppet valve 66 is disposed in the conduit 62 and a second normally closed pilot operated poppet valve 68 is disposed in the conduit 64.

A first sensing arrangement 70 is connected to the conduits 62 and 64 at a location between the fluid actuated mechanism 50 and the first and second normally closed pilot operated poppet valves 66,68 and is operative to sense the highest pressure in the respective conduits 62,64 and deliver the highest pressure signal therefrom through a pilot conduit 72. A second sensing arrangement 74 is interconnected to the conduits 26 and to the conduit 32 at a location between the normally open pilot operated poppet valve 34 and the other end 31 of the fluid actuated mechanism 28 and operative to deliver the highest pressure signal therefrom through a pilot conduit 76.

A signal control system 80 is provided and includes a two-position four-way valve mechanism 82 connected to the source of pressurized fluid by a pilot conduit 84, a one-way check valve 86, and the conduit 40. The two-position four-way valve mechanism 82 is connected to the reservoir 14 by a conduit 88. The signal control system also has a pilot conduit 89 connected between the two-position four-way valve mechanism 82 and the normally open pilot operated poppet valve 34 and a pilot conduit 90 interconnected between the two-position four-way valve mechanism 82 and the first and second normally closed pilot operated poppet valves 66,68.

The conduit 72, from the first sensing arrangement, is operatively connected to the conduit 84 while the pilot conduit 76 from the second sensing arrangement 74 is also connected to the conduit 84.

A first connection port 92 is connected to the signal control system 80 by a pilot conduit 94 that is connected to the conduit 84 generally adjacent the two-position four-way valve mechanism 82. A second connection port 96 is connected by a pilot conduit 98 to the pilot conduit 89 at a location generally adjacent the normally open pilot operated popper valve 34. A third connection port 100 is connected by a conduit 102 to the pilot conduit 90 at a location generally adjacent the first normally closed pilot operated poppet valve 62. A fourth connection port 104 is connected by a pilot conduit 106 to the conduit 90 at a location generally adjacent the second normally closed pilot operated popper valve 68.

A bypass line 110 is connected to the reservoir 14 by a quick disconnect 112. The other end of the bypass line 110 is adapted to be selectively connected to either of the first, second, third or fourth connection ports.

It is recognized that various forms of the hydraulic system could be utilized without departing from the essence of the invention. For example, various valve arrangements could be utilized in place of the first and second two-position three-way valves and the one two-position four-way valve. Likewise, other connection ports could be provided and connected to other points within the hydraulic system.

INDUSTRIAL APPLICABILITY

In the normal operation of the system, an operator makes an input to the hand metering unit 20 to direct pressurized fluid from the first outlet port 22 to the front fluid actuated mechanism 28 for steering of the front pair of wheels 30. The return flow therefrom passes through the normally open pilot operated poppet valve 34 to the reservoir 14 through the hand metering unit 20.

When it is desired to provide coordinated or circle steer, the operator selectively actuates the two-position four-way valve mechanism 82 directing the pressurized fluid from the source 12 to the normally open pilot operated popper valve 34 forcing it to its closed position. By providing an input to the hand metering unit 20, pressurized fluid is directed to the front fluid actuated mechanism 28 through the conduit 26 and return fluid flow therefrom is directed through the conduits 32,64 and 54 to the rear fluid actuated mechanism 50 to steer the rear pair of wheels 52 in a direction opposite to the steering of the front pair of wheels 30. The return flow therefrom passes through the conduit 48 across the second pilot operated poppet valve 66, the conduit 32 and to the reservoir 14 across the hand metering unit 20.

Independent rear steer is obtained by the operator returning the two-position four-way valve mechanism 82 to its initial position wherein pressurize from the source 12 is directed through the pilot conduit 90 to the first and second normally closed pilot operated popper valve 66,68 forcibly holing them in their closed position. Subsequently, the operator actuates either of the first or second two-position three-way valve 44,46 to direct pressurized fluid to the rear fluid actuated mechanism 50 to steer the rear pair of wheels 52 in either direction independent of the front pair of wheels 30.

In order to insure that the respective pilot operated poppet valves 34,66,68 are forcibly held in their closed position depending on the mode of steering, the highest pressure in the rear fluid actuated mechanism 50 is directed through the pilot conduits 72,84 to the two-position four-way valve 82 and subsequently to the respective ones of the pilot operated poppet valves 34,66,68. Likewise, the highest pressure signal in the front fluid actuated mechanism 28 is directed through the pilot conduits 76 and 84 to the two-position four-way valve 82 and subsequently to the respective ones of the pilot operated poppet valves 34,66,68. Consequently, any ground induced forces acting on either the front pair of wheels 30 or the rear pair of wheels 52 are directed to the respective ones of the pilot operated poppet valves 34,66,68 depending on the selected mode of steering.

Upon initial assembly of a hydraulic system and/or subsequent to repair of a hydraulic system, it is necessary to insure that any and all entrapped air is removed from the system and likewise any impurities, such as dirt, are flushed from the system. The method of flushing the hydraulic system 10 includes the steps of connecting the shunt line 36 between the opposite ends 27,31 of the front fluid actuated mechanism 28 and connecting the second shunt line 56 between the opposite ends 49,55 of the rear fluid actuated mechanism 50 followed by the operator making a steer input through the hand metering unit 20. This input directs pressurized fluid through the conduit 26 across the first shunt line 36, through the conduit 32 across the normally open pilot operated poppet valve 34 and back to the reservoir 14 through the hand metering unit 20. Since the velocity of the fluid being directed through the lines is determined by the flow from the source of pressurized fluid 12, any air, dirt and/or other impurities are readily flushed to the reservoir 14 where the filtration system can cleanse the flow.

To purge other parts of the hydraulic system, the operator shifts the two-position four-way valve to its second position which closes the normally open pilot operated poppet valve 34. The fluid flow from the hand metering unit now passes through the conduit 26, the first shunt line 36, the conduit 32, the conduit 64 across the second normally closed pilot operated poppet valve 68, and the conduit 54 to the other end 55 of the rear fluid actuated mechanism 50. The flow continues across the second shunt line 56 and through the conduit 48, the conduit 62 across the first normally closed pilot operated poppet valve 66, the conduit 32 and back to the reservoir 14 through the hand metering unit 20. As noted above, due to the velocity of the fluid flowing through the respective lines, any air, dirt and other impurities are readily removed from the system.

Additionally, the operator can purge the conduits of the independent rear steer mode by returning the two-position four-way valve to its initial position. This directs pressurized fluid to the first and second normally closed pilot operated poppet valves 66,68 forcibly holding them in their closed position. The operator then actuates either one of the first and second two-position three-way valves 44,46 to direct pressurized fluid from the conduit 40 to the rear fluid actuated mechanism 50 across the second shunt line 56 and back to the other one of the first and second two-position three-way valves 44,46 to the reservoir 14.

This same procedure can be utilized to condition the system for operation when the machine has been setting for a period of time in cold atmospheres. The viscosity of the fluid in the system can be reduced by forcing the fluid to flow through the various lines with the first and second shunt lines 36,56 installed. With the shunt lines installed, the front and rear fluid actuated mechanisms 28,50 will not move. This procedure aids in the more efficient operation of the system and helps to add life to the hydraulic components.

Once the hydraulic system 10 has been purged of any air, dirt and/or other impurities and/or the system is conditioned in cold weather, the first and second shunt lines 36,56 are removed to allow for normal operation.

In order to purge the signal control system 80, the bypass line 110 is connected to the reservoir 14 by the quick disconnect 112 and the other end thereof is selectively connected to one of the first, second, third or fourth connection ports 92,96,100,104. By connecting the bypass line 110 to the first connection port 92, pressurized fluid from the conduit 40 is directed through the one-way check 86, the conduit 84, the pilot conduit 94 and across the bypass line 110 to the reservoir 14. The flow of pressurized fluid thereacross from the source of pressurized fluid 12 effectively removes any entrained air, dirt and other impurities from the respective conduits.

By disconnecting the bypass line 110 from the first connection port 92 and connecting the bypass line 110 to the second connecting port 96 and actuating the two-position four-way valve 82 to its second position, pressurized fluid from the conduit 40 is directed across the one-way check 86, the conduit 84, across the two-position four-way valve 82, the conduit 88, the pilot conduit 98 and the bypass line 110 to the reservoir 14 to effectively purge any entrained air, dirt and other impurities from the respective conduits.

By disconnecting the bypass line 110 from the second connection port 96 and reconnecting the bypass line 110 to the third connection port 100 and subsequently returning the two-position four-way valve to its initial position, pressurized fluid from the source 40 is directed through the one-way check 86, the conduit 84, across the two-position four-way valve 82 to the pilot conduit 90, the pilot conduit 102 and the bypass line 110 to the reservoir 14. As previously noted this effectively removes any entrained air, dirt and other impurities from the respective conduits.

Additionally, by disconnecting the bypass line from the third connection port 100 and connecting the bypass conduit 110 to the fourth connecting port 104, the pressurized fluid in conduit 40 is directed across the one-way check 86, the conduit 84, the two-position four-way valve 82, the conduit 90, the pilot conduit 106, and the bypass line 110 to the reservoir 14. Like the previously noted steps, any entrained air, dirt and other impurities are removed from the respective conduits.

Once all of the connection ports from the signal control system 80 has been purged, the bypass line 110 is removed and the system is ready for operation.

When moving a machine into an arctic atmosphere, it is necessary to change the type of hydraulic fluid in order for the machine to work in the extreme cold temperatures. The fluid in the hydraulic system 10 is easily replaced by utilizing the above noted method of purging the system. To totally change the fluid, it is necessary to drain the old fluid from the reservoir 14 and replace with the new fluid, disconnect the reservoir return conduit 88 and connect it to a remote or portable tank or barrel, connect the first and second shunt lines 36,56 and start the machine in order for the source of pressurized fluid 12 to force the new fluid through the respective conduits as noted above. During this process, the new fluid in the reservoir 14 should be replenished as needed. Once the new fluid has been circulated through the system, the first and second shunt lines are removed. The old fluid in the signal control system 80 is removed by connecting the bypass line 110 to the conduit 88 as illustrated in the drawing and selectively connecting the other end of the bypass line 110 to the respective first, second, third and fourth connection ports 92,96,100,104. This allows all of the fluid in the signal control system 80 to be passed to the remote tank. Once all conduits have been purged of old oil, the return conduit 88 is reconnected to the reservoir 14 and the system is fully functional with the new fluid.

In view of the foregoing, it is readily apparent that the subject method for purging a hydraulic system 10 is extremely effective in removing entrapped air, dirt, and other impurities from the hydraulic system. Likewise, the subject invention is very beneficial in replacing all of the hydraulic fluid in the system or conditioning or "warming up" the hydraulic system 10 when the hydraulic system has set for a period of time in cold weather conditions.

Other aspects, objects and advantages of this invention can be obtained from the study of the drawings, the disclosure and the appended claims.

I claim:

1. A method of purging a hydraulic system having a source of pressurized fluid receiving fluid from a reservoir, one or more fluid actuators, one or more valve mechanisms connected to the source of pressurized fluid and operative to direct pressurized fluid to the respective fluid actuators, and a signal control system, the method comprising the following steps:

connecting a shunt line between opposite ends of the respective fluid actuators;

operating the respective valve mechanisms to force fluid from the source of pressurized fluid through the respective valve mechanisms, across the respective shunt lines and back to the reservoir to purge the system.

2. The method of claim 1 including the steps of disconnecting the shunt lines, connecting a bypass line from the reservoir to the signal control system, and forcing fluid from the source of pressurized fluid through the signal control system and the bypass line to the reservoir to purge the signal control system.

3. The method of claim 2, wherein the signal control system includes a plurality of individual connection ports and the step of connecting the bypass line to the signal control system includes the steps of selectively connecting the bypass line to individual ones of the connection ports and forcing the fluid from the source of pressurized fluid through the individual ones of connection ports and the bypass line back to the reservoir.

4. A method of purging a signal control system of a hydraulic system having a source of pressurized fluid receiving fluid from a reservoir, an actuator, and a valve mechanism connected to the source of pressurized fluid and operative to direct pressurized fluid to the actuator, the method comprising the steps of:

providing a connection port that communicates with the signal control system;

connecting a bypass line between the reservoir and the connection port; and forcing fluid from the source of pressurized fluid through the signal control system and the bypass line to the reservoir to purge the signal control system.

5. The method of claim 4 including the step of providing a plurality of connection ports that communicate with the signal control system at various locations and selectively connecting the bypass line to the individual ones of the connecting ports forcing the fluid from the source of pressurized fluid through the one connection port and the bypass line back to the reservoir; and continuing to connect the bypass line to each of the other connection ports and forcing fluid from the source of pressurized fluid therethrough until the signal control system is purged.

* * * * *